United States Patent
Clavijo Lumbreras (10) Patent No.: US 9,303,684 B2
(45) Date of Patent: Apr. 5, 2016

(54) SWIVEL MOUNT FOR SOLAR TRACKER SHAFTS

(71) Applicant: GRUPO CLAVIJO ELT, S.L., Viana (Navarra) (ES)

(72) Inventor: Miguel Clavijo Lumbreras, Viana (ES)

(73) Assignee: GRUPO CLAVIJIO ELT, S.L., Viana (Navarra) (ES)

(*) Notice: Subject to any disclaimer, the term of this patent is extended or adjusted under 35 U.S.C. 154(b) by 0 days.

(21) Appl. No.: 14/076,390

(22) Filed: Nov. 11, 2013

(65) Prior Publication Data

US 2014/0140755 A1 May 22, 2014

(30) Foreign Application Priority Data

Nov. 22, 2012 (ES) .................................. 201231808

(51) Int. Cl.
| | |
|---|---|
| F16D 3/00 | (2006.01) |
| F16C 11/06 | (2006.01) |
| F24J 2/54 | (2006.01) |
| F24J 2/52 | (2006.01) |
| F16C 23/04 | (2006.01) |

(52) U.S. Cl.
CPC .............. F16C 11/0695 (2013.01); F24J 2/541 (2013.01); *F16C 23/043* (2013.01); *F24J 2/5232* (2013.01); *F24J 2002/529* (2013.01); *F24J 2002/5482* (2013.01); *Y02E 10/47* (2013.01); *Y10T 403/32041* (2015.01)

(58) Field of Classification Search
CPC ...... F16C 11/0695; F24J 2/541; F24J 2/5232; F24J 2002/529; F24J 2002/5482; Y02E 10/47; F16B 2/12; Y10T 403/32041

USPC ................. 248/229.14, 229.15, 230.5, 230.6, 248/231.61, 231.71, 540, 534, 535; 403/57
See application file for complete search history.

(56) References Cited

U.S. PATENT DOCUMENTS

| | | | | |
|---|---|---|---|---|
| 3,337,188 | A * | 8/1967 | Manson | 254/412 |
| 3,820,860 | A * | 6/1974 | Stone | 384/428 |
| 4,815,585 | A * | 3/1989 | May | 198/672 |
| 4,832,002 | A * | 5/1989 | Medina | 126/577 |
| 6,058,930 | A * | 5/2000 | Shingleton | 126/600 |
| 6,550,974 | B2 * | 4/2003 | Zoppitelli et al. | 384/498 |
| 2007/0274618 | A1 | 11/2007 | Sandin | |
| 2010/0071683 | A1 | 3/2010 | Selig et al. | |
| 2011/0253195 | A1 * | 10/2011 | Kim | 136/246 |
| 2011/0272367 | A1 * | 11/2011 | Kufner | 211/41.1 |
| 2012/0180845 | A1 | 7/2012 | Cole et al. | |
| 2012/0219243 | A1 | 8/2012 | Jang | |

FOREIGN PATENT DOCUMENTS

ES 2 368 402 A1 11/2011

OTHER PUBLICATIONS

Spanish Search Report No. 201231808 dated Feb. 21, 2013.

* cited by examiner

Primary Examiner — Gregory Binda
Assistant Examiner — Nahad Amiri
(74) Attorney, Agent, or Firm — Lucas & Mercanti, LLP (57) ABSTRACT

A swivel mount for solar tracker shafts having a clamp having an inner surface with a spherical shape and first and second parts forming a brace adapted to hold a solar tracker shaft, wherein the brace formed by the first and second parts has an external surface having a spherical shape, such that the solar tracker shaft is axially retained by the clamp and can be oriented in any required spatial position.

2 Claims, 8 Drawing Sheets

SWIVEL MOUNT FOR SOLAR TRACKER SHAFTS

CROSS REFERENCE TO RELATED APPLICATION

This Application claims the priority of Spanish Patent Application No. P201231808 filed on Nov. 22, 2012, which application is incorporated herein by reference in its entirety.

TECHNICAL FIELD

The present invention relates to the mounts used for bearing solar tracker shafts on which solar panels rest and tilt, proposing a swivel mount that allows aligning the solar tracker shaft in any spatial orientation, the mount being applicable to any type of solar tracker, such as polar trackers with an inclined shaft, azimuth rotation-based trackers, or another type of solar trackers.

STATE OF THE ART

There are different types of solar trackers on the market today, for example, there are single post trackers in which a panel or a panel array is mounted on a single mount, or multi-post trackers in which several panels or panel arrays are mounted on several mounts.

When solar trackers are to be installed on uneven or irregularly shaped orographic surfaces, solar tracker shaft orientation problems usually arise. This problem is worse in the case of multi-post solar trackers, in which a single shaft is used to support and rotate a panel array belonging to one a one and the same row of the solar tracker, in this case the solar panels take up considerable longitudinal space, such that an excessive amount of time is required to correctly orient the solar tracker shaft.

Spanish patent ES2368402A1, belonging to the same applicant as the present invention, discloses a polar-type multi-post tracker made up of several rows of solar panels that are supported on a horizontal frame formed by transverse sections and shafts on which respective rows of solar panels tilt. The shafts of the different rows of solar panels rest on support posts that are driven into the ground. The shaft and support posts are attached by means of cylindrical shaped clamps that allow rotation of the shaft so that the solar panels can tilt on the shaft.

This embodiment thus allows the shaft to be able to rotate in order to tilt the solar panels; however, the cylindrical shape or the clamp does not allow the shaft to be oriented in any spatial position. To achieve this and to be able to offset possible deviations due to an irregular terrain, Spanish patent ES2368402A1 proposes dividing each solar tracker shaft into two half-shafts attached by means or articulated attachments by way of universal joints that keep the half-shafts attached to one another while at the same time allowing their misalignment.

OBJECT OF THE INVENTION

The invention proposes a swivel mount for supporting solar tracker shaft that allows quickly orienting the solar tracker shaft in any required spatial position regardless of the condition of the terrain where the solar tracker is installed.

The swivel mount for solar tracker shafts comprises a clamp surrounding parts bracing the solar tracker shaft, the parts bracing the solar tracker shaft externally having a spherical shape corresponding with a reciprocal inner spherical shape of the clamp, such that the solar tracker shaft is axially retained by the clamp and can be oriented in any required spatial position. In other words, since the parts bracing the shaft form a sphere inside the spherical surface determined by the clamp, the parts cannot come out of the housing in which they are confined.

Installation of the solar tracker in its place of application is aided by the swivel mount of the invention, so for example the solar tracker support posts can be installed in any position on the ground, without needing them to be perfectly upright because the swivel mount allows orienting the tracker shaft offsetting deviations due to the positioning of the support posts, or they allow offsetting any other type of deviation, such as those caused by an irregular terrain where the solar tracker is installed, for example.

A swivel mount for solar tracker shafts is thus obtained, and as a result of its constructive and functional features said mount is preferably applied to the function for which it is intended, allowing the positioning of the shaft in any spatial orientation regardless of the orographic characteristics of the terrain where the solar tracker is arranged.

DETAILED DESCRIPTION OF THE INVENTION

The object of the invention relates to a swivel mount used for securing and orienting a solar tracker shaft (1) in the required position. The swivel mount comprises at least two parts (2, 3) bracing the solar tracker shaft (1). The inside of the parts (2, 3) bracing the shaft (1) has a prismatic shape corresponding with the shape of the solar tracker shaft (1), such that the parts (2, 3) and the tracker shaft (1) form an inseparable assembly when attached. In the example shown in the drawings, the solar tracker shaft (1) is square-shaped. On the outside, however, the parts (2, 3) bracing the shaft (1) have a spherical shape corresponding with the inner shape of a clamp (4) in which the parts (2, 3) are housed.

The clamp (4) consists of a lower base part (5) and an upper tightening part (6) between which the parts (2, 3) bracing the shaft (1) are retained. The spherical shape of the outside of the parts (2, 3) bracing the shaft (1) and of the inside of the clamp (4) allows the spatial orientation of the tracker shaft (1) in any required position.

The lower base part (5) has holes (7) at its ends aligned with holes (8) of the tightening part (6) for the insertion of screws (9) or similar attachment elements, whereby tightening the parts (2, 3) bracing the shaft (1), and therefore the solar tracker shaft (1).

Figure 1:
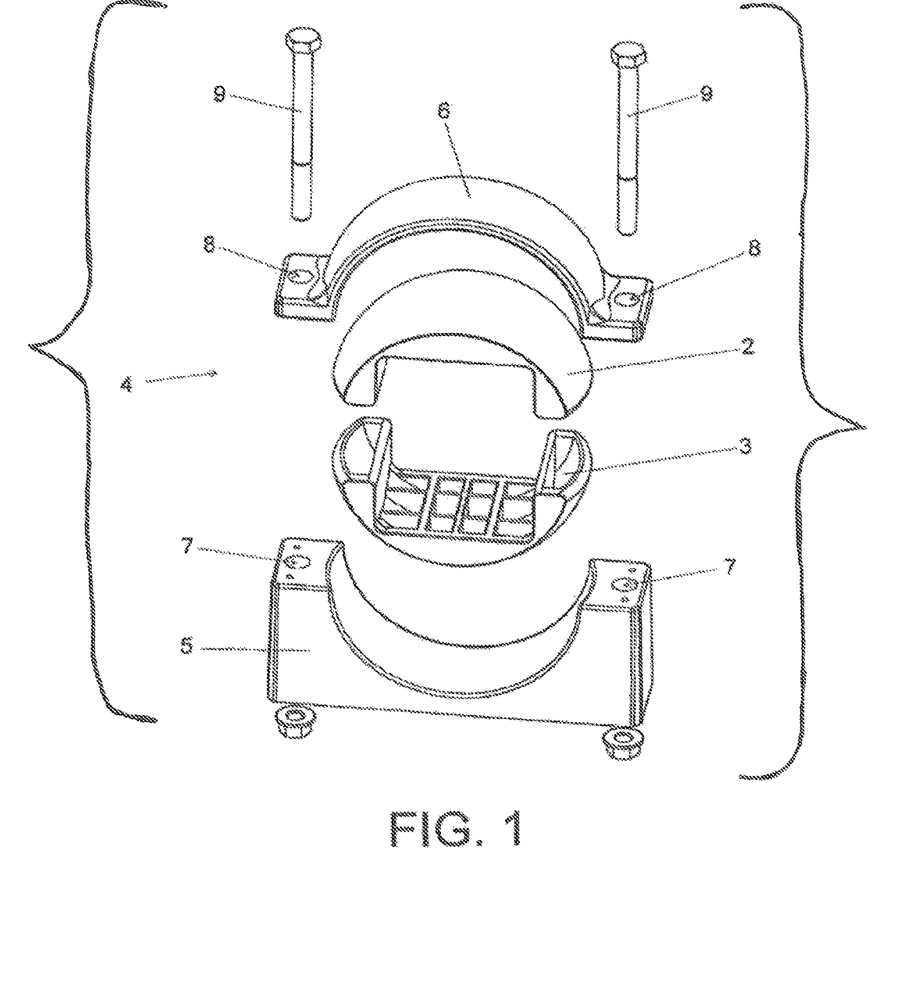
FIG. 1 shows an exploded perspective view of the set of elements forming the swivel mount for solar tracker shafts of the invention.
Figure 2:
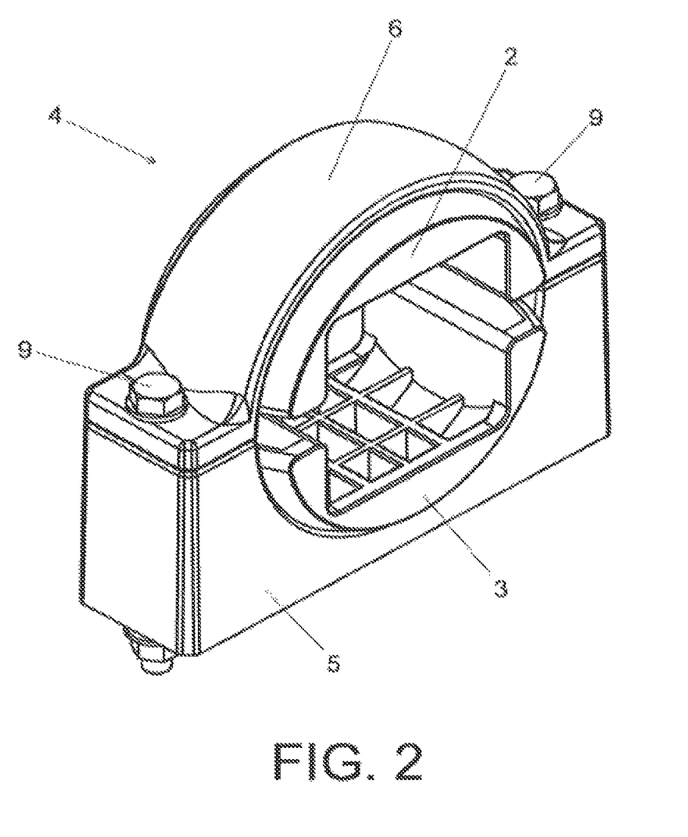
FIG. 2 shows a perspective view of the swivel mount.
Figure 2A:
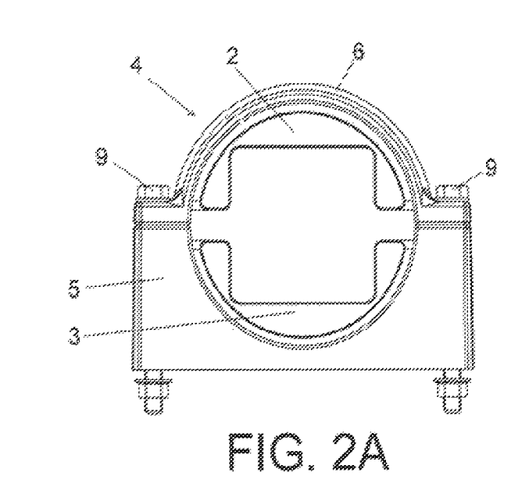
FIGS. 2A, 2B and 2C show an elevational view, a plan view and a cross-section view of the swivel mount, respectively.
Figure 2B:
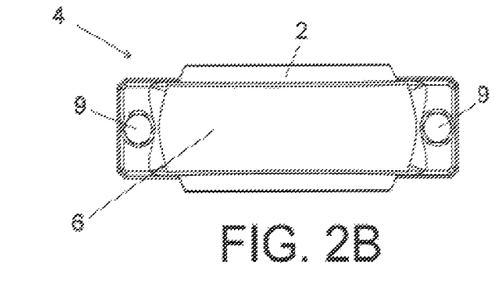
Figure 2C:
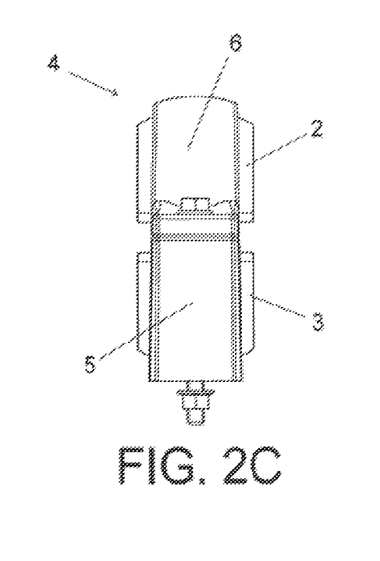
Figure 3:
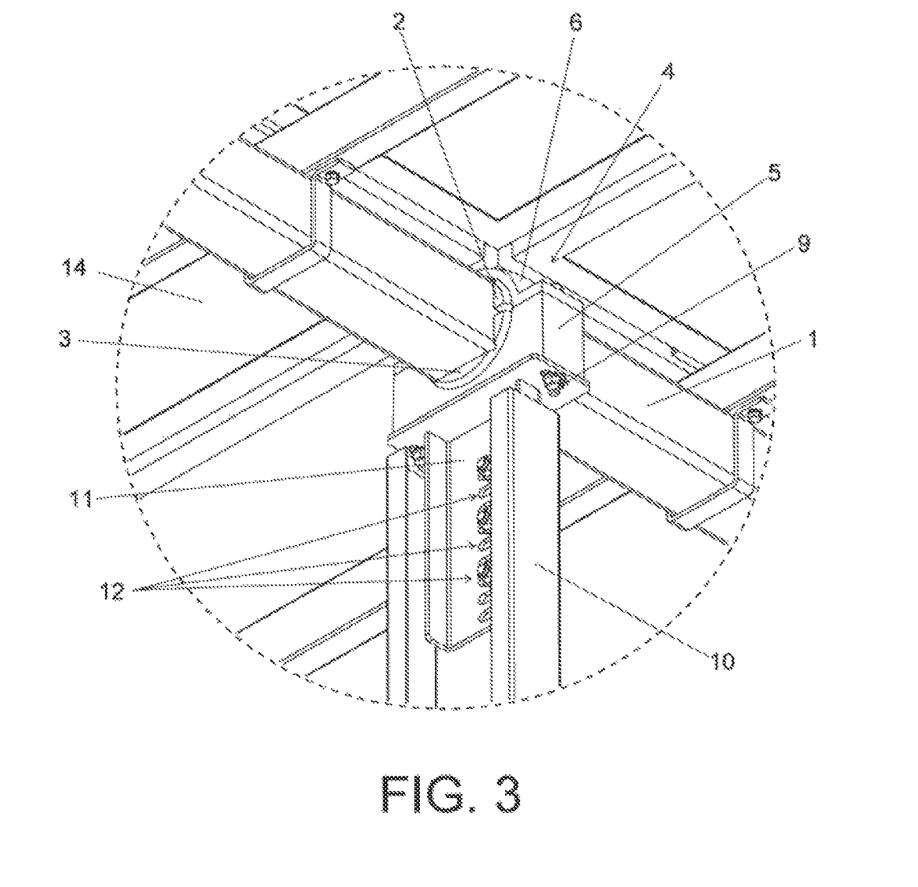
FIGS. 3 and 4 show perspective views of the swivel mount mounted on a solar tracker of application.
Figure 4:
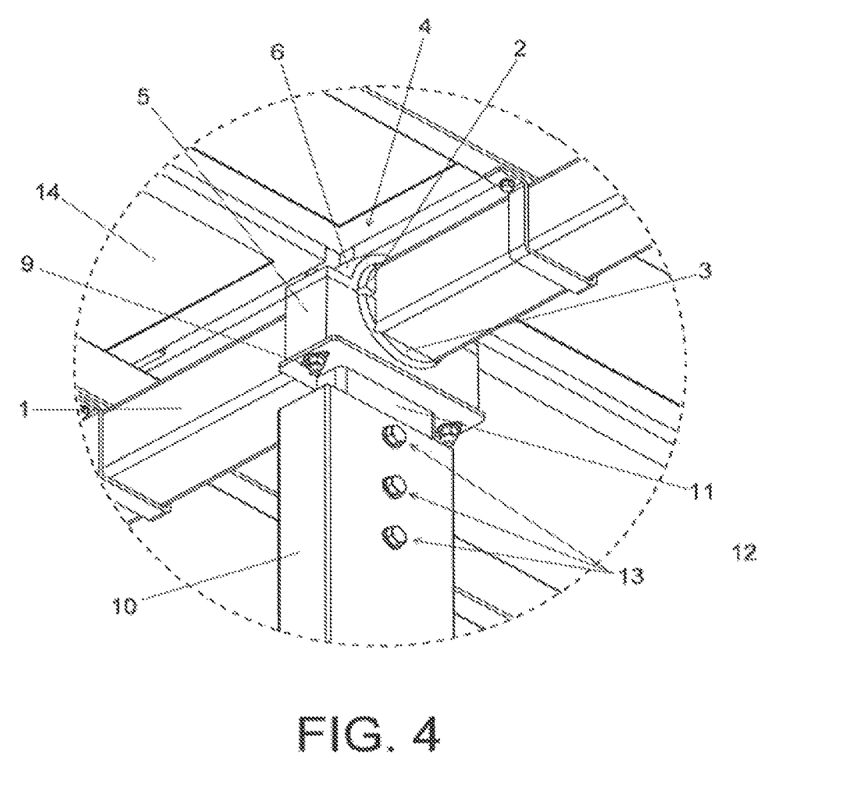

As observed in FIGS. 3 and 4, the lower base part (5) of the clamp (4) is directly or indirectly attached to a respective support post (10) bearing the solar cracker. The possibility of being able no adjust the height of the swivel mount has been envisaged, and to that end the lower base part (5) or the clamp (4) is attached to the post (10) by means of a U-shaped section (11) having a vertical correlation of oblong holes (12), the support post (10) having a reciprocal correlation oil holes (13) such that the height of the swivel mount with respect to its support post (10) can be adjusted by means of the selective alignment of the holes (12, 13) of the support post (10) and the U-shaped section (11). It can thus be seen how the solar panels (14) rest in a tilting manner on the solar tracker shaft (1), which is in turn borne by the swivel mounts that are attached to the ground through support posts (10).

The material of the swivel mount is a plastic which is highly resistant to abrasion, sunlight, temperature, and wear, thereby allowing a drastic reduction of maintenance tasks due to having to apply grease or the like.

Figure 5A:
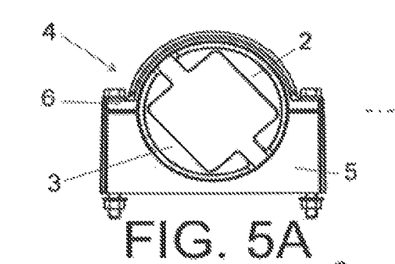
FIGS. 5A to 5G illustrate different spatial positions in which the tracker shaft can be oriented using the swivel mount of the invention.
Figure 5B:
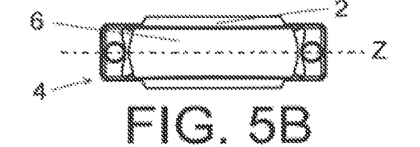
Figure 5C:
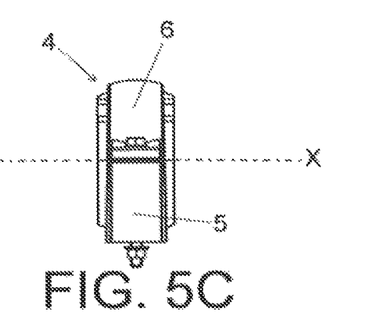
Figures 5D, 5E:
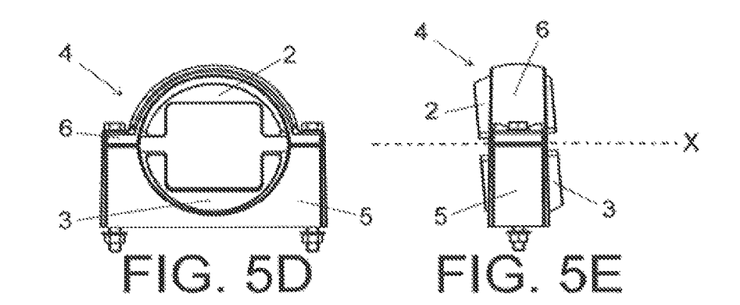
Figure 5F:
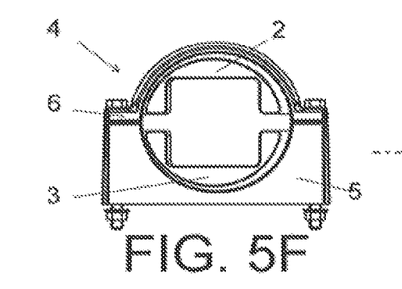
Figure 5G:
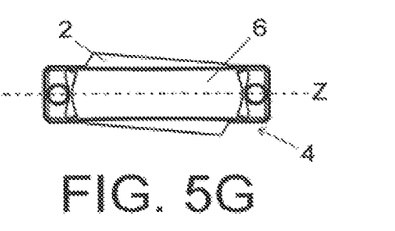

With all this, as seen in the views of FIGS. 5A, 5B and 5C, the swivel mount allows rotation of the solar tracker shaft (1) without the parts (2, 3) bracing the shaft (1) being able to come out of their housing due to axial movement of the tracker shaft (1). FIGS. 5D and 5E show how the tracker shaft (1) can be deviated with respect to the longitudinal direction (X) of the swivel mount, whereas FIGS. 5F and 5G show the deviation of the shaft (1) with respect to the transverse direction (2) of the swivel mount. The swivel mount thus allows spatial orientation of the solar tracker shaft (1) in any required position.

Figure 6:
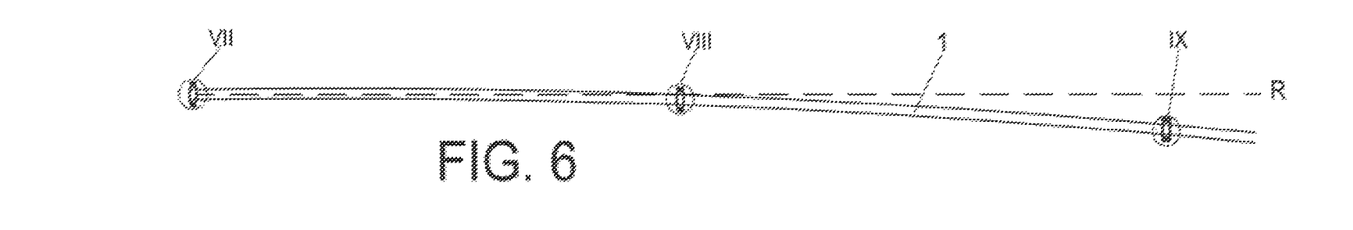
FIG. 6 shows an orientation example of the tracker shaft when there are lateral deviations with respect to the real line of the shaft.
Figure 7:
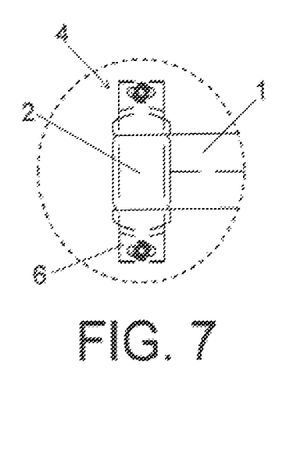
FIGS. 7 to 9 are enlarged details of zones VII, VIII and IX of FIG. 6.
Figure 8:
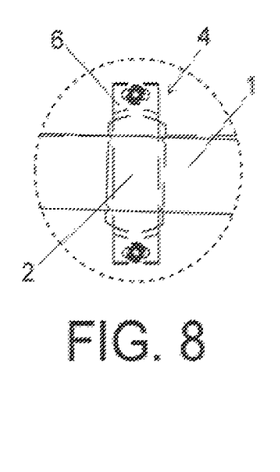
Figure 9:
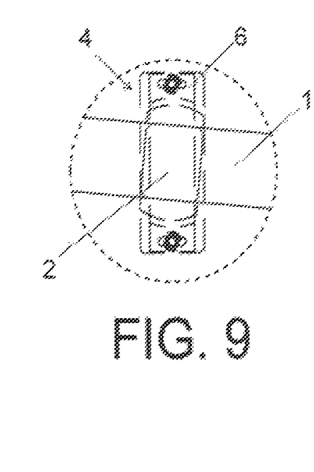

FIG. 6 shows an example of a solar tracker shaft (1) which is laterally deviated with respect to the real line (P) of the solar tracker shaft (1), which is shown as a dotted line. In the enlarged details of FIGS. 7 to 9, it can be seen how the swivel mount of each support post (10) becomes oriented to position the solar tracker shaft (1) in the required position.

Figure 10:
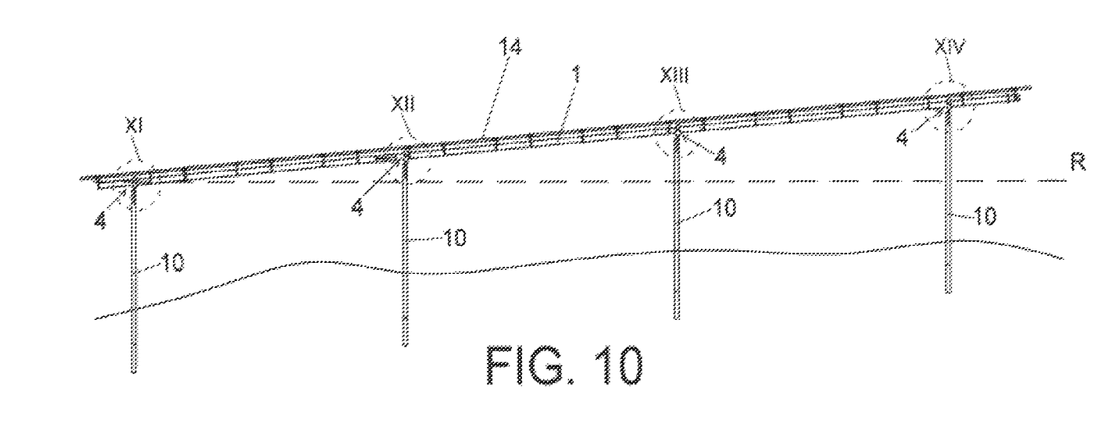
FIG. 10 shows an orientation example of the tracker shaft when there are height variations.
Figure 11:
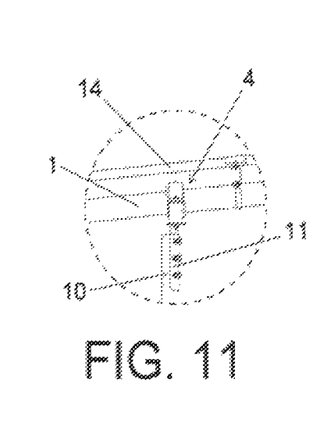
FIGS. 11 to 14 are enlarged details of zones XI, XII, XIII and XIV of FIG. 10.
Figure 12:
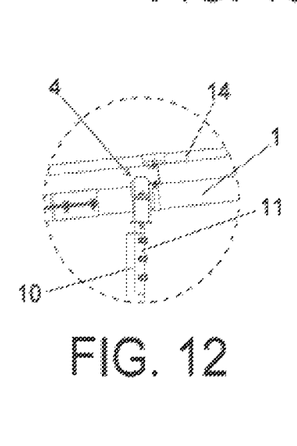
Figure 13:
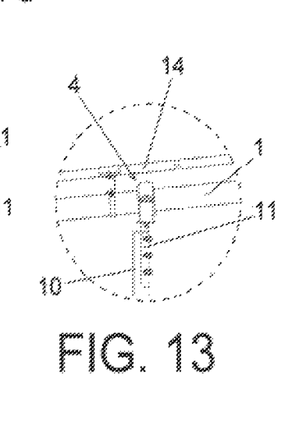
Figure 14:
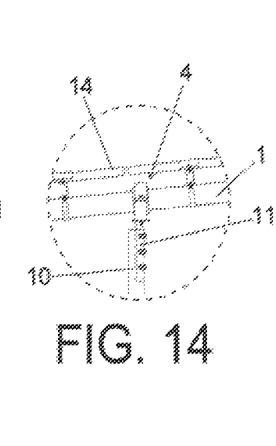

FIG. 10 shows a solar tracker with multiple solar panels (14) that rest and tilt on the solar tracker shaft (1), the shaft (1) in turn being supported on the support posts (10) by means of respective swivel mounts. The enlarged details of FIGS. 10 to 14 show how the swivel mounts correct the orientation of the solar tracker shaft (1) to adjust it to the height variations that are established with respect to the real line (R) of the solar tracker shaft (1), which is shown as a dotted line.

The invention claimed is:

1. A combination comprising:
    a plurality of solar tracking support posts;
    a swivel mount attached to each of the support posts;
    a solar tracking shaft passing through the swivel mount of each of the support posts;
    wherein the swivel mount comprises;
    a clamp comprising an inner surface having a first spherical shape; and
    first and second parts housed in the clamp and adapted to be joined together to form a brace, the brace being adapted to hold the solar tracker shaft, wherein the brace formed from the first and second parts comprises an external surface having a second spherical shape, the external surface facing the inner surface and the brace being further adapted to swivel in three dimensions within the clamp, such that the solar tracker shaft is axially retained by the clamp and can be oriented in any required spatial position, and the clamp and the first and second parts comprise an abrasion-resistant plastic material that does not require lubrication.

2. The combination according to claim 1, wherein the swivel mount is attached to each of the solar tracker support posts by means of a U-shaped section that allows adjusting the height of the swivel mount.

* * * * *